(12) United States Patent
Tashiro

(10) Patent No.: US 7,975,801 B2
(45) Date of Patent: Jul. 12, 2011

(54) APPARATUS FOR CONTROLLING VEHICLE

(75) Inventor: Tsutomu Tashiro, Munich (DE)

(73) Assignee: Denso Corporation, Kariya (JP)

( * ) Notice: Subject to any disclaimer, the term of this patent is extended or adjusted under 35 U.S.C. 154(b) by 492 days.

(21) Appl. No.: 12/287,806

(22) Filed: Oct. 14, 2008

(65) Prior Publication Data

US 2009/0095565 A1    Apr. 16, 2009

(30) Foreign Application Priority Data

Oct. 15, 2007   (JP) .................................. 2007-268326

(51) Int. Cl.
  *B62D 6/04* (2006.01)
  *B62D 5/04* (2006.01)
(52) U.S. Cl. ......................................... 180/446; 73/457
(58) Field of Classification Search ................. 180/446, 180/443; 701/37; 73/457
  See application file for complete search history.

(56) References Cited

U.S. PATENT DOCUMENTS

2009/0294206 A1* 12/2009 Oblizajek et al. ............. 180/446

FOREIGN PATENT DOCUMENTS

JP      08-132831     5/1996

OTHER PUBLICATIONS

U.S. Appl. No. 12/287,776, filed Oct. 14, 2008.

* cited by examiner

*Primary Examiner* — Paul N Dickson
*Assistant Examiner* — Keith Frisby
(74) *Attorney, Agent, or Firm* — Harness, Dickey & Pierce, PLC

(57) ABSTRACT

Tire-uniformity components may generate a lateral force on a vehicle body, when the vehicle is in a turning movement. The lateral force may cause vibrations on the vehicle body. The controller controls a motor of an electric power steering system to modulate an assist torque acting on steerable wheels in accordance with the tire-uniformity components. The assist torque is modulated in the same direction as the lateral force. As a result, it is possible to reduce vibrations on the vehicle body, since the modulated assist torque avoids conflict with the lateral force and release the lateral force.

14 Claims, 7 Drawing Sheets

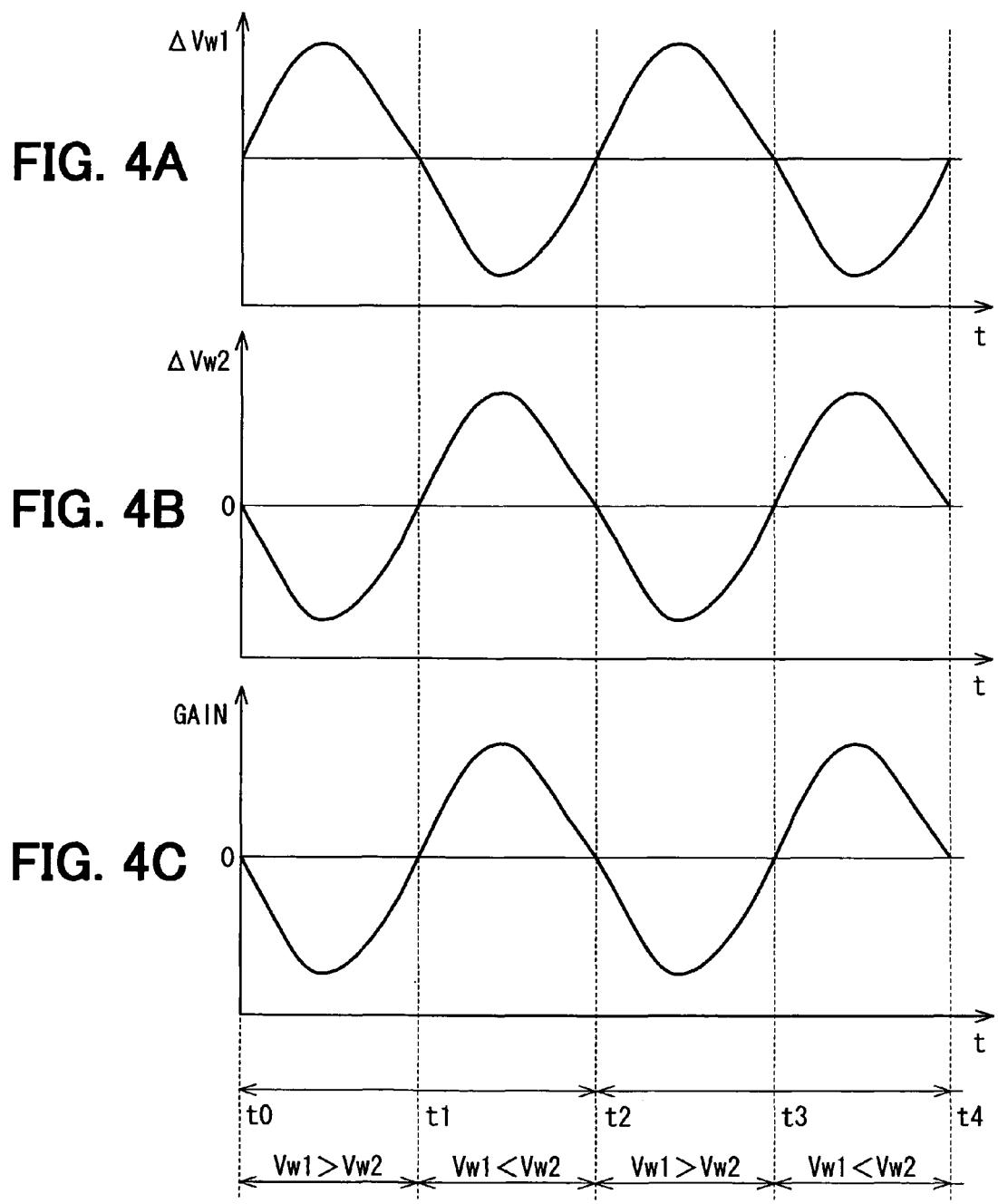

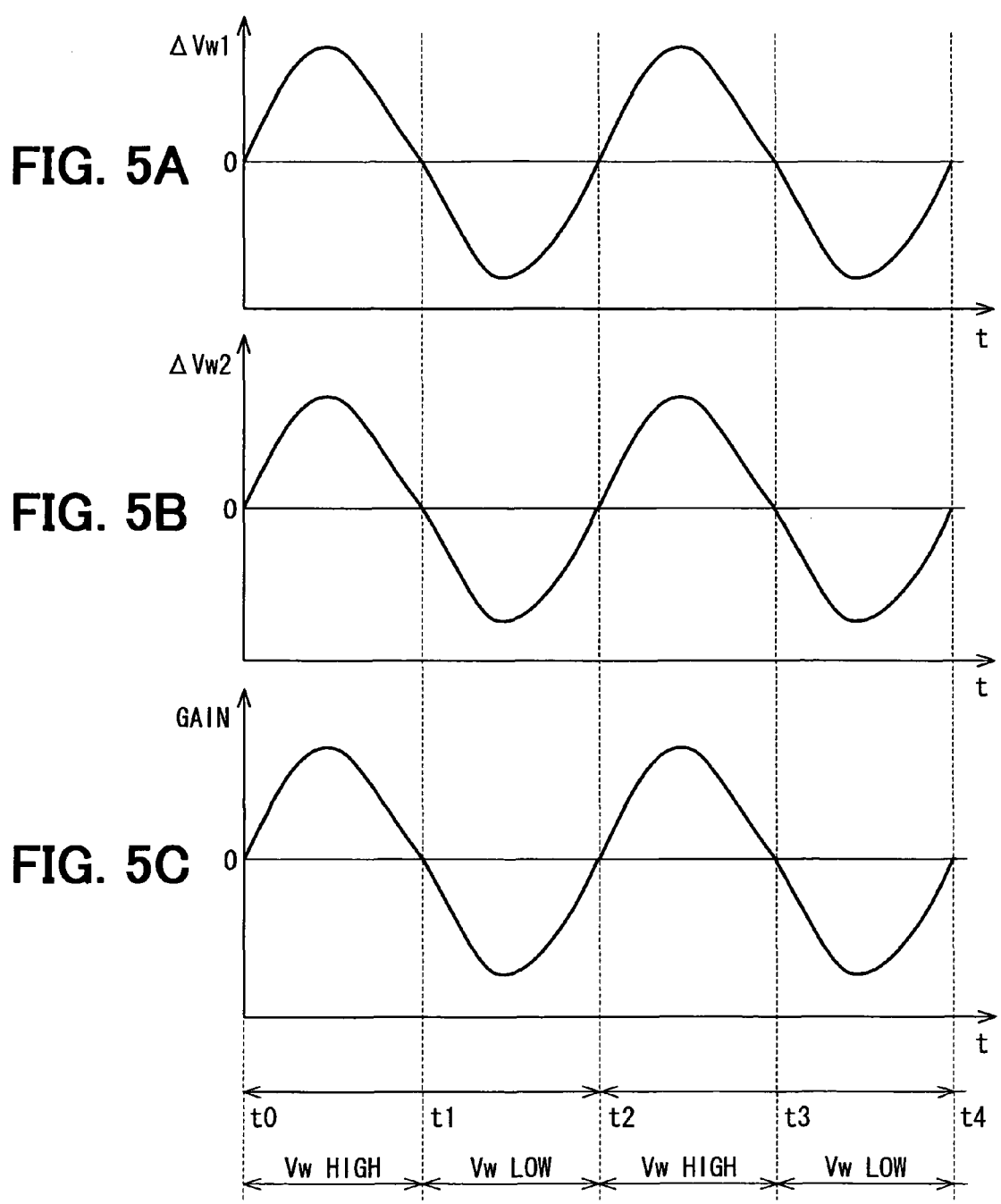

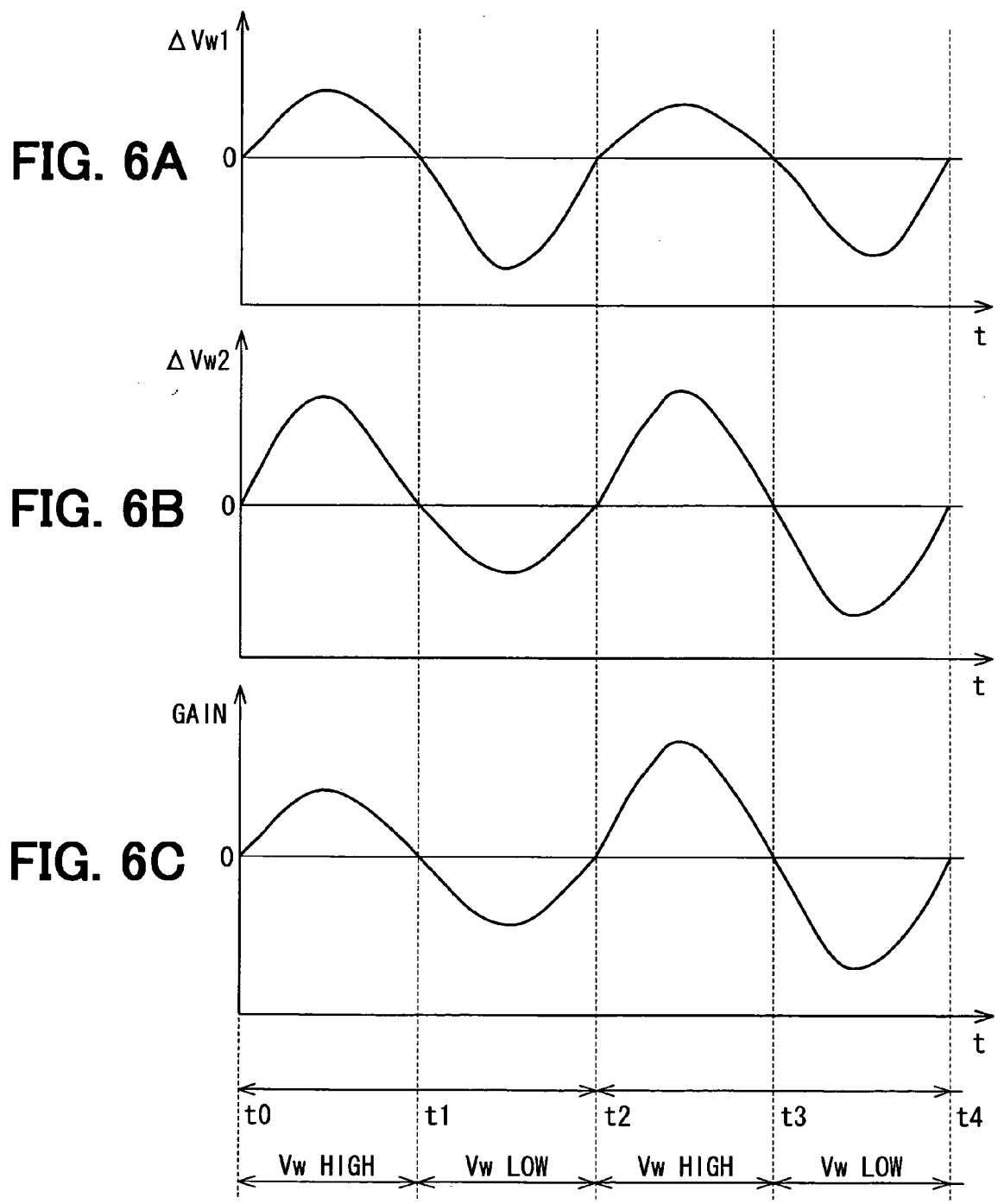

APPARATUS FOR CONTROLLING VEHICLE

CROSS REFERENCE TO RELATED APPLICATION

This application is based on Japanese Patent Application No. 2007-268326 filed on Oct. 15, 2007, the contents of which are incorporated herein by reference in its entirety.

FIELD OF THE INVENTION

The present invention relates to an apparatus for controlling vehicle, especially for controlling vehicle movement such as vibration caused by rotation speed fluctuations of wheels.

BACKGROUND OF THE INVENTION

JP-A-H08-132831 discloses an apparatus for determining a tire related conditions such as air pressure in a tire, an abrasion amount of a tire, and vibrating modes of a tire, e.g., a standing wave mode based on a tire-uniformity component. The tire-uniformity component is a variable which may be indicated by a fluctuation on rotation speed of a wheel during a rotation of the wheel. The tire-uniformity component can be obtained by processing a signal indicative of rotation speed of a wheel.

One embodiment of a practical application of the tire-uniformity components and a method for calculating the tire-uniformity components is described in JP-A-H08-132831, which is incorporated herein by reference. Additionally, a brief description of the tire-uniformity components is provided below.

SUMMARY OF THE INVENTION

Usually, a tire for vehicle is manufactured by winding and wrapping steel wires and rubber layers. A tire has an outer profile close to a perfect circle, but actually being not perfect circle. Therefore, a tire has unbalances in some physical aspects such as a strength and density along the circumference of the tire. Such physical unbalances may destroy the uniformity of tire. In addition, a wheel for a vehicle has other components such as a rim, bolts and hub, which may also obtain unbalances on a wheel. In order to decrease the unbalances on a wheel, a dynamic balance is adjusted for each wheel after assembling a tire on a rim by attaching a balancer weight on each wheel.

However, even if a balancer weight is attached, it is impossible to perfectly cancel a weight distribution along the circumference of a wheel. For this reason, when a vehicle cruises at a constant speed, each wheel still generates a very small fluctuation on rotation speed due to physical unbalances such as an unbalance of weight distribution on a tire. The rotation speed fluctuation represents the tire-uniformity components. Therefore, the tire-uniformity components observed on the rotation speed includes the unbalances on not only a tire but also other components mechanically connected with a wheel. The rotation speed fluctuation can be observed as a cyclic wave form having a maximum value, a minimum value, and a cyclic period corresponding to one rotation of a wheel. The rotation speed fluctuation representing the tire-uniformity component may be observed as a wave form close to a sine curve.

Each of a plurality of wheels on a vehicle usually generates unique fluctuation. For example, the rotation speed fluctuations of wheels are different in phase. Such phase differences may be varied by movements of a vehicle such as turning movement, acceleration and deceleration, and outside disturbances such as a disturbance from a road surface. For example, the rotation speed fluctuations on a right side wheel and a left side wheel are widely varied between an in-phase relation and an anti-phase relation.

In case that a vehicle is turning, the rotation speed fluctuations on a right side wheel and a left side wheel may become an anti-phase relation. In case that the phase relation is in an anti-phase relation, and the rotation speed of the left side wheel is greater than the rotation speed of the right side wheel, then, the vehicle body receives force that rotates the vehicle body from left to right. In case that the phase relation is in an anti-phase relation, and the rotation speed of the left side wheel is smaller than the rotation speed of the right side wheel, then, the vehicle body receives force that rotates the vehicle body from right to left. Since the phase relation and a level of the rotation speed fluctuation are varied, the force that rotates the vehicle body is also changed in response to the rotation speed fluctuations on wheels.

Meanwhile, steerable wheels such as front wheels receive steering forces via a steering mechanism including tie-rods and knuckle arms. The steering force changes orientation of the steerable wheel in a desired steering angle. The forces caused by the rotation speed fluctuations on the right and left side wheels have directions opposite to the steering forces acting on the steerable wheels. Such opposed forces acting on the steering system including the wheel may generate a very small vibrations on the steering system and even on a vehicle body.

In addition, even if the phase relation is in an in-phase relation, the vehicle body may get very small vibrations during a turning movement. The rotation speed fluctuations in an in-phase relation may generate very small vibrations along a direction toward a front side and a back side of the vehicle during the vehicle runs straight. However, if the vehicle was turning when the rotation speed fluctuations are in an in-phase relation, the fluctuations may generate forces to rotate the vehicle body in right or left. Such forces may also have opposite directions to the steering force, therefore, very small vibrations may be generated on the steering system and the vehicle body by the rotation speed fluctuations.

In view of the foregoing problems, it is an object of the present invention to provide an apparatus for controlling a vehicle that suppresses vibrations caused by a difference between the rotation speed fluctuations on wheels.

It is an additional object of the present invention to provide an apparatus for controlling a vehicle steering device for providing a steering assist capable of suppressing vibrations caused by a difference between the rotation speed fluctuations on wheels.

An embodiment of the invention provides a vehicle control apparatus for controlling force acting on steerable wheels. In one embodiment of the invention, the vehicle control apparatus for controlling a vehicle, comprises speed signal generating means for generating speed signals corresponding to each one of steerable wheels, discriminating means for discriminating and outputting vibration components on the speed signals from the speed signal generating means, the vibration components having a waveform similar to the sine wave and a cyclic period corresponding to a rotation of the steerable wheel, turn determining means for determining whether the vehicle is in a turning movement or not, and control means for controlling force on the steerable wheels in order to suppress vibrations on the vehicle, the force being adjusted based on the vibration components discriminated by the discriminating means to have a direction that is the same as a direction of a lateral force on the vehicle caused by the vibration components, when the turning movement of the vehicle is determined by the turn determining means.

According to the invention in the embodiment, steering force acting on the steerable wheels via a steering system is changed to absorb or release lateral force generated by the vibration components on the steerable wheels. Therefore, it is possible to reduce vibrations on the vehicle body, since it is possible to avoid a conflict between the steering force and the lateral force.

The control means may adjust the force based on a phase difference and/or a composite level of the vibration components. According to the embodiment, it is possible to reduce vibrations effectively, since the lateral force is varied in accordance with the phase difference and/or the composite level.

The vehicle control apparatus may be a component of an electric power steering system which is adapted to supply force on the steerable wheels in order to assist a manipulation on a steering wheel. According to the embodiment, it is possible to change the steering force by using a controlling function that is installed in the electric power steering system.

The electric power steering system may have calculating means for calculating a fundamental assist force based on a vehicle speed and rotating force on the steering wheel, and the control means adjusts the force by correcting the fundamental assist force based on at least the phase difference between the vibration component generated on an outside steerable wheel and the vibration component generated on an inside steerable wheel, when the vehicle is in the turning movement. According to the embodiment, it is possible to reduce vibrations while maintaining an assisting function of the electric power steering system.

The control means may increasingly correct the fundamental assist force by an anti-phase increasing amount so as to act greater assist force than the fundamental assist force in a steering direction, when the vibration component generated on the outside steerable wheel is greater than the vibration component generated on the inside steerable wheel, and when the vibration component generated on the outside steerable wheel and the vibration component generated on the inside steerable wheel are shifted in phase greater than a predetermined phase.

The vehicle receives force in a turn promoting direction in accordance with a difference between the vibration components, when the vibration component on the outside steerable wheel is greater with respect to the vibration component on the inside steerable wheel. In such a condition, if the steering wheel is supplied with greater steering force than a fundamental steering force, the steerable wheel may easily steer its orientation in response to a relatively smaller force generated by the vibration components. The greater steering force may be supplied by increasingly corrects the fundamental steering force. As a result, it is possible to absorb the lateral force generated by the vibration components. In addition, it is possible to promote a smooth turning movement of the vehicle.

The control means may increase the anti-phase increasing amount, as the vibration component generated on the outside steerable wheel becomes greater with respect to the vibration component generated on the inside steerable wheel.

The control means may decreasingly correct the fundamental assist force by an anti-phase decreasing amount so as to act smaller assist force than the fundamental assist force in a steering direction, when the vibration component generated on the outside steerable wheel is smaller than the vibration component generated on the inside steerable wheel, and when the vibration component generated on the outside steerable wheel and the vibration component generated on the inside steerable wheel are shifted in phase greater than a predetermined phase. In the embodiment, the vehicle receives force in a turn preventing direction in accordance with a difference between the vibration components. A decreased amount of steering force enables to absorb the lateral force in the turn preventing direction.

The control means may increase the anti-phase decreasing amount, as the vibration component generated on the outside steerable wheel becomes smaller with respect to the vibration component generated on the inside steerable wheel.

The control means may increasingly correct the fundamental assist force by an in-phase increasing amount so as to act greater assist force than the fundamental assist force in a steering direction, when the sum of the vibration component generated on the outside steerable wheel and the vibration component generated on the inside steerable wheel is greater than a means rotation speed of the wheels, and when the vibration component generated on the outside steerable wheel and the vibration component generated on the inside steerable wheel are shifted in phase smaller than a predetermined phase.

If a phase difference between the vibration components on the steerable wheels is smaller than a predetermined value, it is possible to consider that the levels of the vibration components on the steerable wheels are increased and decreased synchronously. The vehicle receives relatively increased force to propel the vehicle forward, when the sum of the vibration components is greater than an average value of the rotation speed of the steerable wheels during a rotation. In such a condition, if the vehicle is in a turning movement, the lateral force is also increased. Therefore, in order to absorb and release the lateral force, the fundamental assist force is increasingly corrected.

The control means may increase the in-phase increasing amount, as the sum of the vibration component generated on the outside steerable wheel and the vibration component generated on the inside steerable wheel becomes greater.

In the other embodiment, the control means may increase the in-phase increasing amount, as the vibration component generated on the outside steerable wheel becomes greater with respect to the vibration component generated on the inside steerable wheel.

The control means may decreasingly correct the fundamental assist force by an in-phase increasing amount so as to act smaller assist force than the fundamental assist force in a steering direction, when the sum of the vibration component generated on the outside steerable wheel and the vibration component generated on the inside steerable wheel is smaller than a means rotation speed of the wheels, and when the vibration component generated on the outside steerable wheel and the vibration component generated on the inside steerable wheel are shifted in phase smaller than a predetermined phase. The sum of the vibration components is smaller than an average value of the rotation speed of the steerable wheels during a rotation. Therefore, the vehicle receives relatively decreased force to propel the vehicle forward. In such a condition, if the vehicle is in a turning movement, the lateral force is also decreased. Therefore, in order to absorb and release the lateral force, the fundamental assist force is decreasingly corrected.

The control means may increase the in-phase decreasing amount, as the sum of the vibration component generated on the outside steerable wheel and the vibration component generated on the inside steerable wheel becomes smaller.

In the other embodiment, the control means may decrease the in-phase decreasing amount, as the vibration component generated on the outside steerable wheel becomes greater with respect to the vibration component generated on the inside steerable wheel.

BRIEF DESCRIPTION OF THE DRAWINGS

Additional objects and advantages of the present invention will be more readily apparent from the following detailed description of preferred embodiments when taken together with the accompanying drawings. In which:

FIGS. 4A, 4B and 4C are graphs showing tire-uniformity components and a gain in an anti-phase relation according to the first embodiment;

FIGS. 5A, 5B and 5C are graphs showing tire-uniformity components and a gain in an in-phase relation according to the first embodiment;

FIGS. 6A, 6B and 6C are graphs showing tire-uniformity components and a gain in an in-phase relation according to a modification of the first embodiment.

DETAILED DESCRIPTION OF THE PREFERRED EMBODIMENTS

Figure 1:
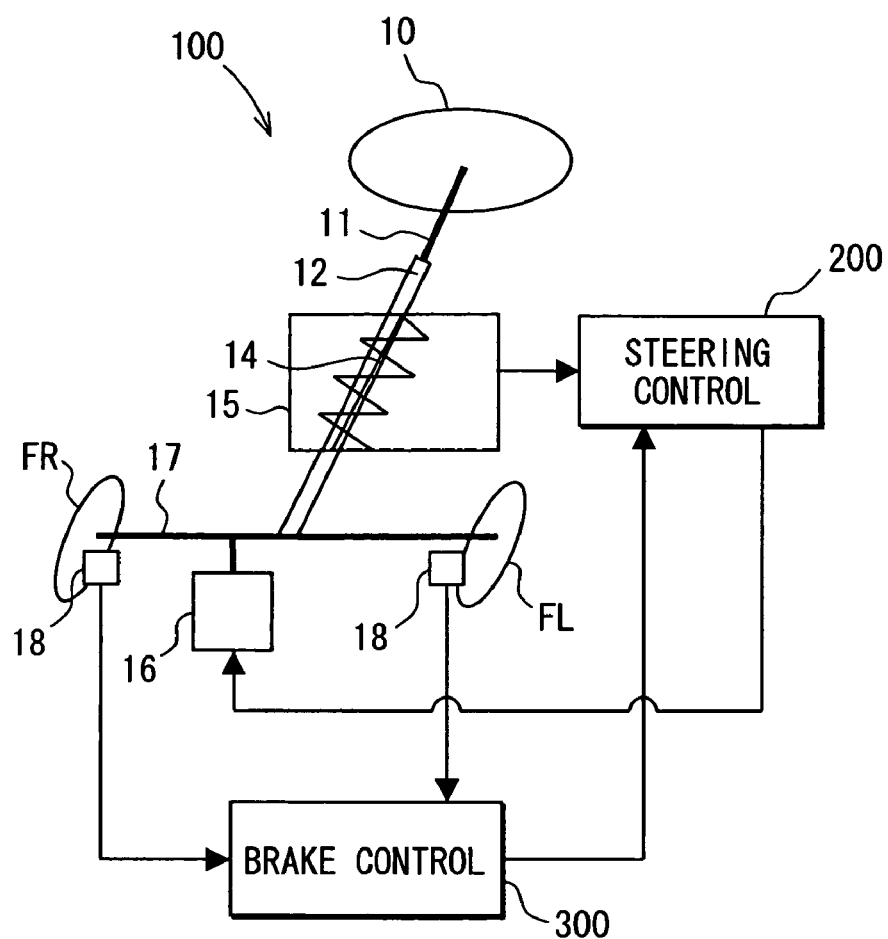
FIG. 1 is a block diagram showing a vehicle control apparatus according to a first embodiment of the invention.

A first embodiment of the invention is described below with the drawings. Referring to FIG. 1, a vehicle control apparatus 100 is provided as an electric power steering system. In other words, the vehicle control apparatus 100 is installed as a component of the electric power steering system. The vehicle control apparatus 100 supplies a vibration absorbing force on a steerable wheel such as a front wheel by using an adjusting function of a wheel control apparatus. The vibration absorbing force is supplied by adjusting an assist torque of the electric power steering system. The electric power steering system enables the vehicle control system 100 to supply precisely controlled force on the steerable wheels.

The vehicle control apparatus 100 includes ordinary components for the electric power steering system, such as a steering wheel 10, a steering shaft 11, a pinion shaft 12, a motor 16 for generating the assist torque, a rack shaft 17, and a controller 200.

The controller 200 performs several control functions including a steering assist control and a vibration suppressing control by controlling the motor 16 based on signals from a plurality of sensors. In the steering assist control, the controller 200 generates an assist torque in response to a steering action of a driver. In the vibration suppressing control, the controller 200 controls the motor 16 to suppress vibrations on a vehicle body by supplying the vibration absorbing force on the steerable wheels, when the tire-uniformity components of the steerable wheels generate forces in a lateral direction of the vehicle. The vibration absorbing force and the lateral force generated by the tire-uniformity components have the same direction.

The steering wheel 10 is connected with an end of the steering shaft 11. The other end of the steering shaft 11 is coupled to the pinion shaft 12 so that the steering shaft 11 and the pinion shaft 12 are rotated together. The pinion shaft 12 has an input shaft and an output shaft. A torque sensor 15 is disposed between the input shaft and the output shaft.

The pinion shaft 12 has a pinion gear on the end of the output shaft. The pinion gear engaged with a rack gear formed on the rack shaft 17. The rack shaft 17 has both ends to which the steerable wheels operatively coupled respectively. The rack shaft 17 is coupled with the steerable wheels via tie-rods and knuckle arms. The steerable wheels are a front right wheel FR and a front left wheel FL. Therefore, the front wheels FR and FL are steered as the steering wheel 10 is rotated by the driver through a well known rack and pinion mechanism. When the vehicle is turning right, the front right wheel FR is placed as an inside front wheel Vw1, and the front left wheel FL is placed as an outside front wheel Vw2. When the vehicle is turning left, the front right wheel FR is placed as an outside front wheel Vw2, and the front left wheel FL is placed as an inside front wheel Vw1. Those wheels may be selectively called as an inside steerable wheel and an outside steerable wheel.

The torque sensor 15 includes a torsion bar 14. The torsion bar 14 engages the input shaft and the output shaft in the pinion shaft 12. Therefore, a rotating force applied on the steering wheel 10 makes the torsion bar 14 twisted to enable a relative rotation between the input shaft and the output shaft in a certain rotating angle corresponding to a rotating torque applied on the steering wheel 10 by the driver. The torque sensor 15 generates a signal proportion to the rotating torque in response to the rotating angle, and submits the signal to the controller 200. The other type of known torque sensors can be used alternatively.

The motor 16 has a rack and pinion mechanism that couples an output shaft of the motor 16 and a rack shaft 17. An assist torque generated by the motor 16 can be transmitted to the rack shaft 17, and assists a steering manipulation of the driver. Each of the steerable wheels receives a steering force composed of a drive's manipulation force and an assist force supplied by the electric power steering system.

A wheel speed sensor 18 is provided on the front right wheel FR. Similarly, a wheel speed sensor 18 is provided on the front left wheel FL. The wheel speed sensors 18 provides speed signal generating means for generating speed signals corresponding to each one of the steerable wheels. The wheel speed sensor 18 has a rotor rotating with the wheel and a pick-up coil electromagnetically coupled with the rotor. The rotor is made of a magnetic material formed in a disc shape with a plurality of teeth. The pick-up coil is placed adjacent to the rotor and to face the teeth to detect changing magnetic field as the rotor rotates. The pick-up coil outputs an alternating signal indicative of a rotation speed. The signals from the wheel speed sensors 18 are input into the brake control device 300. The brake control device 300 performs processing for detecting and calculating rotation speeds, and tire-uniformity components. The tire-uniformity components can be also recognized as vibration components on the signal of the rotation speed. The rotation speeds and the tire-uniformity components may be calculated by the controller 200 instead.

The brake control device 300 processes the output signals from the wheel speed sensors 18 into pulse signals by a circuit for shaping wave form. Then, the brake control device 300 calculates a rotation speed based on time periods between pulses on the pulse signal. Further, the brake control device 300 calculates a tire-uniformity component based on the rotation speed. The tire-uniformity component is a vibration component like a sine wave on the rotation speed during one rotation of the wheel. The tire-uniformity component has a cyclic period corresponding to a rotation of the wheel. The brake control device 300 calculates a vehicle speed based on a plurality of rotation speeds of the wheels. Then, the brake control device 300 outputs the vehicle speed and the tire-uniformity components to the controller 200.

Figure 2:
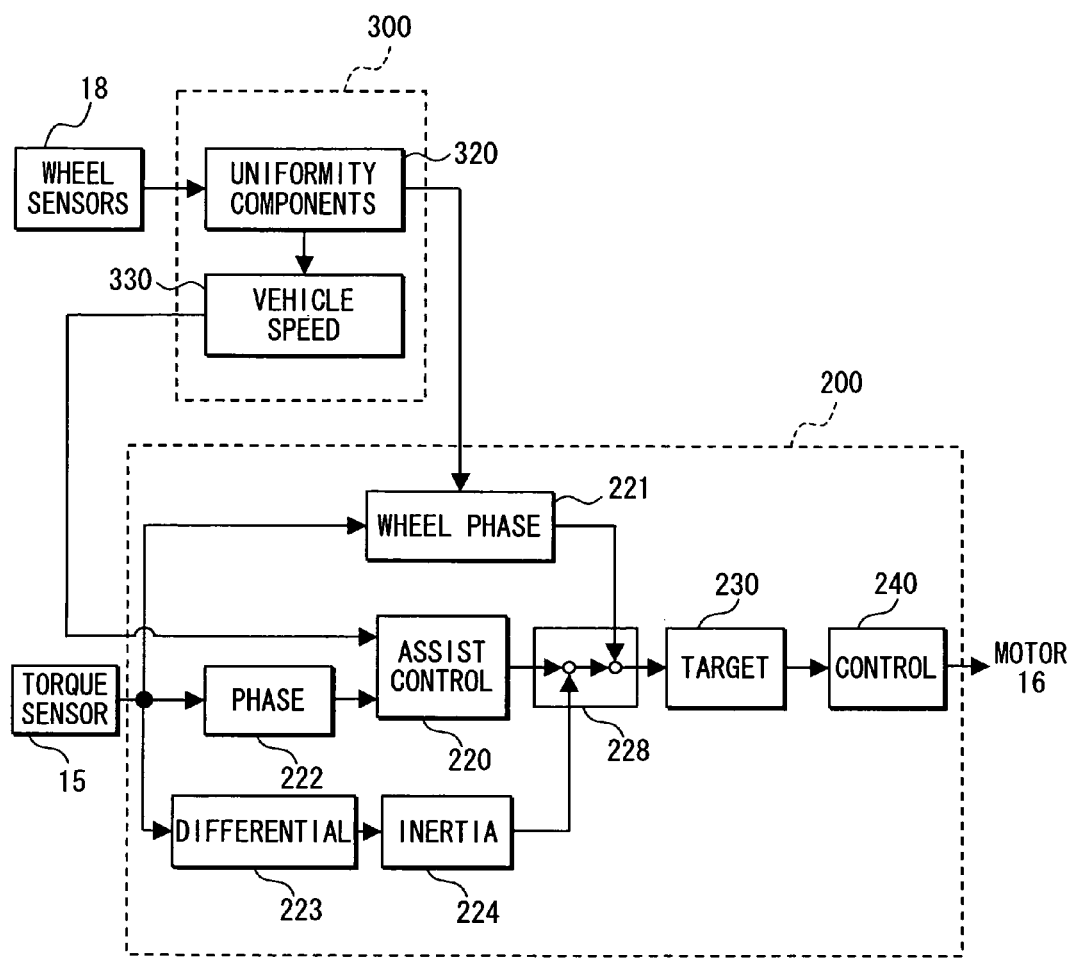
FIG. 2 is a block diagram showing processes performed by a controller according to the first embodiment.

Referring to FIG. 2, the controller 200 and the brake control device 300 provides functional blocks to perform the steering assist control and the vibration suppressing control.

The brake control device 300 has a tire-uniformity component calculating block 320 for calculating the tire-uniformity component of the front right wheel FR and the tire-uniformity component of the front left wheel FL. The block 320 provides discriminating means for discriminating and outputting vibration components on the speed signals. The block 320 discriminates the vibration components having a waveform similar to the sine wave and a cyclic period corresponding to a rotation of the steerable wheels. The brake control device 300 has a vehicle speed calculating block 330 for calculating the vehicle speed based on the rotation speed of the front right wheel FR and the rotation speed of the front left wheel FL by eliminating noise such as a slip component. The tire-uniformity components are output to a wheel phase control block 221 in the controller 200. The vehicle speed is output to an assist control block 220 in the controller 200. The torque sensor 15 detects the rotating torque on the steering wheel 10. The rotating torque is delivered to a wheel phase control block 221, a phase compensation block 222 and a differential block 223.

The wheel phase control block 221 calculates a correcting torque based on the tire-uniformity components and the rotating torque. The correcting torque is designed to correct the assist torque that is calculated by the other blocks such as the assist control block 220. The correcting torque is added with the other signals in an adding block 228 to provide a target assist torque.

The phase compensation block 222 performs phase compensation to the rotating torque detected by the torque sensor 15, and output it to the assist control block 220. The assist control block 220 calculates an assist torque based on the vehicle speed and the rotating torque. The assist control block 220 may have a predetermined characteristic that obtains the assist torque based on the vehicle speed and the rotating torque compensated in the phase compensation block 222.

The differential block 223 calculates a differential value of the rotating torque, and output it to the inertia compensation block 224. An Inertia compensation block 224 calculates an inertia compensational torque based on the differential value of the rotating torque. The inertia compensation block 224 may have a predetermined characteristic that obtains the inertia compensational torque based on the differential value of the rotating torque. The inertia compensational torque is added with the other signals in the adding block 228 to provide the target assist torque.

The adding block 228 calculates the target assist torque by summing the assist torque calculated by the assist control block 220, the correcting torque calculated by the wheel phase control block 221, and the inertia compensational torque calculated by the inertia compensation block 224. The adding block 228 outputs the target assist torque to a target current calculating block 230. The target current calculating block 230 calculates a target current Iq based on the target assist torque and outputs the target current Iq. The target current Iq is calculated so that the motor 16 generates an actual assist torque corresponding to the target assist torque. The target current Iq is supplied to a current control block 240. The current control block 240 controls an actual current flowing through the motor 16. The current control block 240 makes the actual current equal to the target current Iq. The current control block 240 may perform a feedback control.

The values calculated in each blocks may have the other dimensions such as current or coefficient. For example, the wheel phase control block 221 may calculate a correcting current. In this case, the correcting current is supplied to the target current calculating block 230. The correcting current may be directly added to a current value calculated based on the assist torque and the inertia compensational torque. As a result, it is possible to achieve the target current Iq similar to the above description. Alternatively, the wheel phase control block 221 may calculates a correcting coefficient. In this case, the correcting coefficient may be obtained to at least one of the adding block 228 and the target current calculating block 230. The adding block 228 and the target current calculating block 230 may apply the correcting coefficient to the output value. As a result, it is possible to achieve the target assist torque and the target current Iq similar to the above description.

Figure 3:
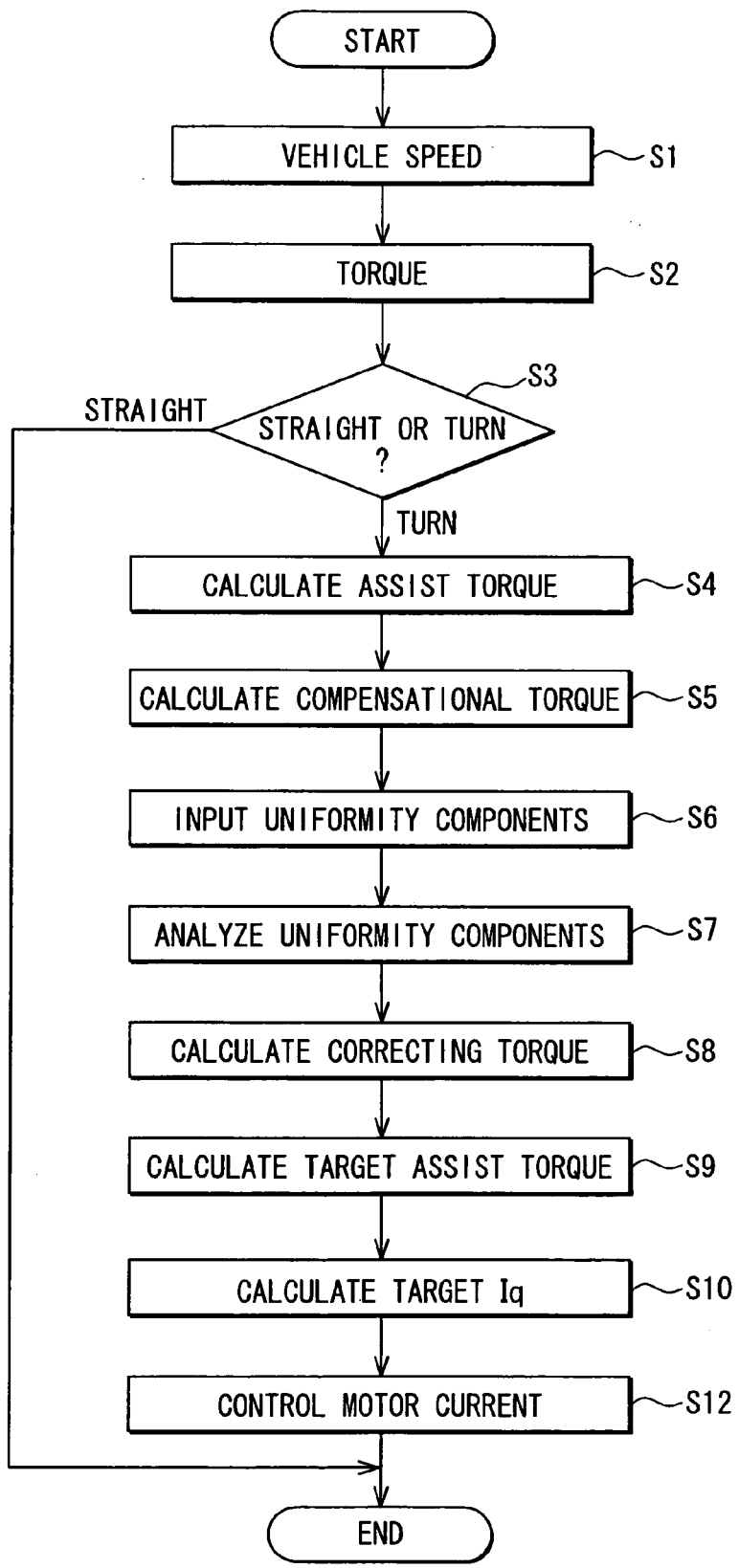
FIG. 3 is a flowchart showing processes performed by the apparatus according to the first embodiment.

Referring to FIG. 3, the controller 200 performs the following processes.

The controller 200 starts the flowchart in response to a turning on of a vehicle power switch such as an ignition switch. In a step S1, the controller 200 inputs the vehicle speed from the brake control device 300. In a step S2, the controller 200 detects and calculates the rotating torque based on the signal from the torque sensor 15. The rotating torque indicates a torque applied on the steering wheel 10 by the driver. In the step S2, a phase compensation process for the rotating torque is performed simultaneously.

In a step S3, driving condition of the vehicle is determined based on signals from sensors. The controller 200 determines whether the vehicle is in a straight movement or in a turning movement based on the rotating torque detected in the step S2. For example, it is possible to determine the vehicle is in the straight movement when the rotating torque is zero or smaller than a threshold value. It is possible to determine the vehicle is in the turning movement when the rotating torque is greater than a threshold value. The controller 200 may determines whether the straight movement or the turning movement based on a difference between the rotation speeds of the wheels. The controller 200 may further determine whether the vehicle is in a right turning or a left turning. In addition, the other sensors such as a rotating angle sensor for detecting a rotating angle of the steering wheel 10 can be used. In case that the vehicle is in the straight movement, the controller 200 jumps the following process and complete the flowchart. In case that the vehicle is in the turning movement, the controller 200 advances the process to a step S4. The step S3 provides turn determining means for determining whether the vehicle is in a turning movement or not.

In the step S4, the assist torque is calculated base on the vehicle speed and the rotating torque. In this calculation, a predetermined characteristic such as a predetermined functional expression is used. In a step S5, the differential value of the rotating torque is calculated. In the step S5, the inertia compensational torque is also calculated based on the differential value. In this calculation, a predetermined characteristic such as a predetermined functional expression is used. The inertia compensational torque is introduced in the embodiment to compensate variable components relating to the inertia.

In a step S6, the tire-uniformity component on the front right wheel and the tire-uniformity component on the front left wheel are retrieved from the brake control device 300. The method for calculating the tire-uniformity component is briefly described below, but is also described in the other documents such as JP-A-H08-132831.

The signals from the wheel speed sensors 18 are processed into a pulse signal maintaining cyclic periods. Then, time periods Δtn between pulses are measured. Here, n indicates a number of samples. Since a plurality of pulses are generated during a rotation of the wheel, a plurality of time periods Δt1, Δt2, Δt3-ΔtN are measured during a rotation of the wheel. A mean time period ΔtM for a rotation of the wheel is calculated by an expression, $$(\Sigma \Delta tn)/N = \Delta tM.$$

Here, N is a number of samples. The symbol Σ means a summation from n=1 to n=N corresponding to a group of samples detected during a rotation of the wheel. Then, a value Δθ(n) is calculated by an expression 1, $$\Delta\theta(n) = \Delta tn / \Delta tM.$$

The value Δθ(n) includes a tire-uniformity component Δθu(n) and an error data Δθr(n). The error data Δθr(n) indicates a manufacturing error of the rotor.

In the above expression 1, each of the time periods Δtn is divided by the mean time period ΔtM. The time period Δtn indicates a time where the wheel rotates a predetermined rotation angle corresponding to an angle between two adjacent teeth on the rotor. The mean time period ΔtM is an average time of the time periods Δtn for a rotation of the wheel. As a result, the value Δθ(n) means a ratio that indicates a fluctuation of each time period Δtn to the mean time period ΔtM.

The value Δθ(n) may be replaceable with a value Δθ'(n) which can be obtained by an expression 2, $$\Delta\theta'(n) = (\Sigma \Delta\theta(n)k)/M.$$

Here, k is a number of samples. The symbol Σ means a summation from k=1 to k=M. In the expression 2, the ratio indicating a fluctuation of the time period Δtn to the mean time period ΔtM is obtained as a mean value for M times. Here, M is rotations of the wheel.

In the case of expression 2, it is possible to increase accuracy of the ratio Δθ'(n), but more time is necessary to achieve the ratio Δθ'(n). In other words, the wheel must rotates M times to obtain the ratio Δθ'(n).

The error data Δθr(n) is obtained beforehand by measuring an amount of manufacturing error of the rotor. The error data Δθr(n) is stored in a memory device in the brake control device 300. The error data Δθr(n) is a ratio of a rotation angle obtained by an expression 3, $$\Delta\theta r(n) = \theta n/(2n/N).$$

In expression 3, a rotation angle of each teeth θn is divided by a mean rotation angle of teeth (2n/N).

Then, the tire-uniformity component Δθu(n) is obtained by an expression 4, $$\Delta\theta u(n) = (\Delta\theta(n)-1) - (\Delta\theta r(n)-1).$$

In the expression 4, the tire-uniformity component Δθu(n) is obtained by subtracting the error data Δθr(n) from the ratio Δθ(n).

In the expression 4, 1 is subtracted from the ratio Δθ(n), since the ratio is calculated as a ratio with respect to a reference value. Because of the similar reason, 1 is also subtracted from the error data Δθr(n).

In stead of preparing and subtracting the error data Δθr(n), the tire-uniformity component Δθu(n) can be obtained by applying digital filter technique that removes high frequency components corresponding to a manufacturing error of the rotor. For example, a low pass filter such as the second-order Butterworth low pass filter can be used to process the ratio Δθ(n) for this purpose.

In a step S7, the controller 200 analyzes and calculates a phase difference and a value of composite level. The phase difference and the composite level of the tire-uniformity components change force acting on the vehicle body. The force acts upon the vehicle body in a lateral direction. The lateral force rotates the vehicle body. Therefore, the lateral force may be referred to as a rotating force.

The phase difference is obtained by analyzing the tire-uniformity component of the front right wheel and the tire-uniformity component of the front left wheel. The phase difference may be called as a phase relation such as the in-phase relation and the anti-phase relation. The phase difference is obtained in order to identify modes of the lateral force. In the first mode, in the anti-phase relation, the lateral force acts an inside direction or an outside direction with respect to the turning movement of the vehicle in accordance with a difference between the tire-uniformity components. In the second mode, in the in-phase relation, the lateral force acts an inside direction or an outside direction with respect to the turning movement of the vehicle in accordance with fluctuations of the rotation speed of the wheels.

The composite level may be called as a level difference between the tire-uniformity component of the front right wheel and the tire-uniformity component of the front left wheel. The composite level is a value obtained based on an instantaneous level of the tire-uniformity component of the front right wheel and an instantaneous level of the tire-uniformity component of the front left wheel. The composite level is obtained as a difference between the instantaneous levels of the tire-uniformity components in the anti-phase relation. The composite level is obtained as a sum of the instantaneous levels of the tire-uniformity components in the in-phase relation. The composite level is obtained in order to indicate at least magnitude of the lateral force generated by the tire-uniformity components.

For example, in case that the phase difference can be considered as the anti-phase relation since the wave forms of the tire-uniformity components are shifted out of a certain range such as ¼ cyclic period, and the composite level indicates that the tire-uniformity component of the front left wheel is greater than that of the front right wheel, then the force acts to rotate the vehicle body from left to right.

In case that the phase difference can be considered as the anti-phase relation since the wave forms of the tire-uniformity components are shifted out of the range of ¼ cyclic period, and the composite level indicates that the tire-uniformity component of the front left wheel is smaller than that of the front right wheel, then the force acts to rotate the vehicle body from right to left.

In case that the phase difference can be considered as the in-phase relation since the wave forms of the tire-uniformity components are shifted within the certain range such as ¼ cyclic period, and the vehicle is in a turning movement, then a vehicle speed fluctuation in the forward and reverse direction of the vehicle generated by the tire-uniformity components influences and appears in the lateral direction of the vehicle body. Therefore, the vehicle body receives the force in the lateral direction and is rotated.

As a result, the vehicle body receives the lateral force that rotates the vehicle body in right or left. The lateral force changes its direction and magnitude in response to the cyclic period, the phase difference and the levels of the tire-uniformity components. The lateral force acts against the steering force that changes an orientation of the steerable wheels. Therefore, the lateral force generates very small vibrations on the steering system and the vehicle body.

In a step S8, the controller 200 calculates the correcting torque based on the phase difference and the composite level. The correcting torque may be obtained by looking up a predetermined map having parameters at least including the phase difference and the composite level. The correcting torque is calculated and determined to supply the vibration absorbing force on the steerable wheels in a steering direction that is the same as a direction of the lateral force, when the lateral force caused by the tire-uniformity components acts on the vehicle. Therefore, it is possible to avoid a conflict between the lateral force caused by the tire-uniformity components and the steering force acting on the steerable wheels in an opposite directions. In other words, it is possible to change the steering force in order to at least partially absorb or cancel the lateral force. In still other words, the controller 200 modulates the steering force to release the tire-uniformity components related force. As a result, it is possible to reduce vibrations on the vehicle body, since it is possible to avoid a condition both forces acting against each other.

In a step S9, the controller 200 sums the correcting torque calculated in the step S8, the assist torque calculated in the step S4 and the inertia compensational torque calculated in the step S5 in order to obtain a target assist torque. The step S9 provides a correcting function in which a fundamental assist torque is corrected by the correcting torque. The sum of the assist torque and the inertia compensational torque obtains the fundamental assist torque. Therefore, it is possible to perform both the steering assist control and the vibration suppressing control simultaneously. In the steering assist control the driver's manipulating force on the steering wheel 10 is assisted by adding assist torque. In the vibration suppressing control, vibrations on the vehicle body is suppressed by adjusting the assist torque acting in the steering direction in response to the tire-uniformity components, which generate the lateral force in the lateral direction of the vehicle body.

In a step S10, the controller 200 calculates a target current Iq based on the target assist torque calculated in the step S9. In a step S12, the controller 200 performs a current control in which a current supplied to the motor 16 is adjusted to the target current Iq.

The controller 200 repeats the process described above for every predetermined processing period, e.g., 12 ms. The controller 200 terminates the processing in response to a turning off of the ignition switch.

The steps S4 through S12 provides control means for controlling force on the steerable wheels in order to suppress vibrations on the vehicle. The force is adjusted based on the vibration components such as the tire-uniformity components discriminated by the block 320. The force is adjusted to have a direction that is the same as a direction of a lateral force on the vehicle caused by the vibration components. The control means controls the force when the turning movement of the vehicle is determined by the turn determining means.

A method for calculating and determining the correcting torque is described below. In the following description, in order to make simplify the description and help understanding, the method is described under conditions where the phase relation is in a perfect in-phase relation and a perfect anti-phase relation. However, it is understood that the idea and method described below can be applied similarly to the other conditions, e.g., in a middle condition while the phase relation is being shifted between the in-phase relation and the anti-phase relation.

FIGS. 4A, 4B and 4C show the tire-uniformity components and a gain for calculating the correcting torque when the phase relation is the anti-phase relation while the vehicle is in the turning movement. The correcting torque is obtained by applying the gain to the rotating torque detected by the torque sensor 15. Therefore, the gain mutually related to the correcting torque. A signal $\Delta Vw1$ shows a value of the tire-uniformity component of the inside front wheel Vw1 placed inside of the turning movement of the vehicle. A signal $\Delta Vw2$ shows a value of the tire-uniformity component of the outside front wheel Vw2 placed outside of the turning movement of the vehicle.

Figure 7A:
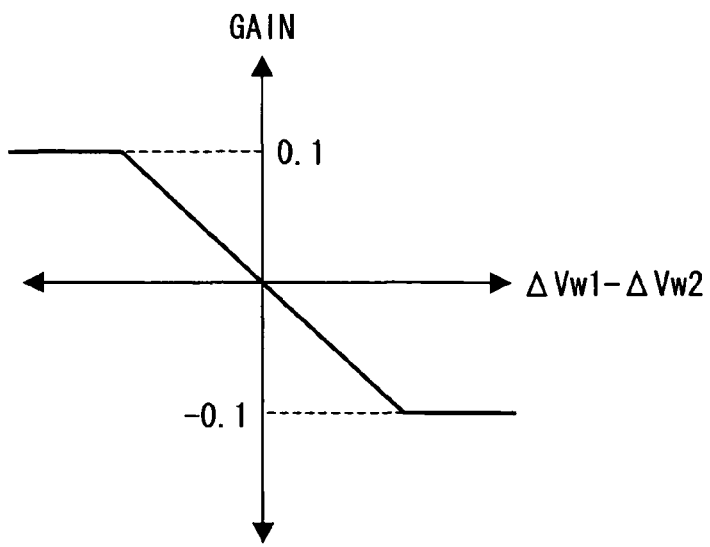
FIGS. 7A and 7B are graphs showing maps for determining the gain in an in-phase relation and an anti-phase relation according to the first embodiment.
Figure 7B:
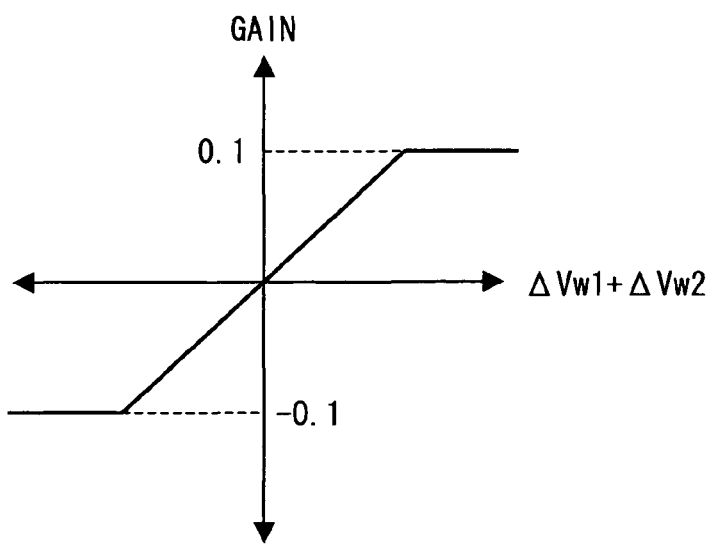

In case that the tire-uniformity components $\Delta Vw1$ and $\Delta Vw2$ shown in FIGS. 4A and 4B are calculated in the brake control device 300, the controller 200 determines that the tire-uniformity components $\Delta Vw1$ and $\Delta Vw2$ are in the anti-phase relation, since the tire-uniformity components $\Delta Vw1$ and $\Delta Vw2$ are shifted greater than a predetermined phase, e.g., ¼ cyclic period. The controller 200 has a memory device for storing both the map for determining the gain in the in-phase relation and the map for determining the gain in the anti-phase relation. FIG. 7A shows one example of the map for determining the gain in the anti-phase relation. FIG. 7B shows one example of the map for determining the gain in the in-phase relation.

Referring to FIGS. 4A, 4B and 4C, the tire-uniformity component $\Delta Vw1$ of the inside front wheel Vw1 is greater than the tire-uniformity component $\Delta Vw2$ of the outside front wheel Vw2 at a period of time between a time t0 and a time t1, and a period of time between a time t2 and a time t3.

When the tire-uniformity component $\Delta Vw1$ of the inside front wheel Vw1 is greater than the tire-uniformity component $\Delta Vw2$ of the outside front wheel Vw2, the composite level of the tire-uniformity components $\Delta Vw1$ and $\Delta Vw2$ generates the lateral force acting on the vehicle in a direction that prevents the turning movement of the vehicle. In such a condition, if the electric power steering device supplies a fundamental assist torque calculated based on the rotating torque onto the front wheels, the steering force supplied on the front wheels and turn preventing force generated by the tire-uniformity components make a conflict and may generate vibrations on the vehicle body.

In order to avoid such a conflict, the controller 200 obtains negative value for the gain at the period of time between the time t0 and the time t1, and the period of time between the time t2 and the time t3, as shown in FIG. 4C. The gain having negative value decreasingly corrects the fundamental assist torque. Therefore, the electric power steering device supplies smaller assist torque that is smaller than the fundamental assist torque by an anti-phase decreasing amount. Such a smaller assist torque enables the front wheels to easily change its orientation toward an opposite side to the turning movement of the vehicle. Therefore, it is possible to absorb the lateral force acting in a turn preventing direction, i.e., a reverse direction to the turn movement of the vehicle by adjusting the assist torque. As a result, it is possible to reduce vibrations on the vehicle body.

On the other hand, the tire-uniformity component $\Delta Vw1$ of the inside front wheel Vw1 is smaller than the tire-uniformity component $\Delta Vw2$ of the outside front wheel Vw2 at a period of time between a time t1 and a time t2, and a period of time between a time t3 and a time t4.

When the tire-uniformity component $\Delta Vw1$ of the inside front wheel Vw1 is smaller than the tire-uniformity component $\Delta Vw2$ of the outside front wheel Vw2, the composite level of the tire-uniformity components $\Delta Vw1$ and $\Delta Vw2$ generates the lateral force acting on the vehicle in a direction that promotes the turning movement of the vehicle. In such a condition, if the electric power steering device supplies a fundamental assist torque calculated based on the rotating torque onto the front wheels, the steering force supplied on the front wheels and turn promoting force generated by the tire-uniformity components make a conflict and may generate vibrations on the vehicle body.

In order to avoid such a conflict, the controller 200 obtains positive value for the gain at the period of time between the time t1 and the time t2, and the period of time between the time t3 and the time t4, as shown in FIG. 4C. The gain having positive value increasingly corrects the fundamental assist torque. Therefore, the electric power steering device supplies greater assist torque that is greater than the fundamental assist torque by an anti-phase increasing amount. Such a greater assist torque enables the front wheels to easily change its orientation toward the same side to the turning movement of the vehicle. Therefore, it is possible to absorb the lateral force acting in a turn promoting direction, i.e., a forward direction to the turn movement of the vehicle by adjusting the assist torque. As a result, it is possible to reduce vibrations on the vehicle body.

As shown in FIG. 4C, the gain is determined to have magnitude in accordance with the composite level of the tire-uniformity components $\Delta Vw2$ and $\Delta Vw1$. The gain becomes greater in the negative, as the tire-uniformity component $\Delta Vw1$ of the inside front wheel Vw1 becomes greater with respect to the tire-uniformity component $\Delta Vw2$ of the outside front wheel Vw2. As the difference ($\Delta Vw1-\Delta Vw1$) becomes greater in the positive, the gain is decreased to have the greater absolute value in the negative. In other words, the controller 200 increases the anti-phase decreasing amount, as the tire-uniformity component generated on the outside front wheel becomes smaller with respect to the tire-uniformity component generated on the inside front wheel. Such a characteristic is required because the lateral force in the turn preventing direction becomes greater, as the tire-uniformity component $\Delta Vw1$ of the inside front wheel Vw1 becomes greater with respect to the tire-uniformity component $\Delta Vw2$ of the outside front wheel Vw2.

The gain becomes greater in the positive, as the tire-uniformity component $\Delta Vw1$ of the inside front wheel Vw1 becomes smaller with respect to the tire-uniformity component $\Delta Vw2$ of the outside front wheel Vw2. As the difference ($\Delta Vw1-\Delta Vw2$) becomes greater in the negative, the gain is increased to have the greater absolute value in the positive. In other words, the controller 200 increases the anti-phase increasing amount, as the tire-uniformity component generated on the outside front wheel becomes greater with respect to the tire-uniformity component generated on the inside front wheel. Such a characteristic is required because the lateral force in the turn promoting direction becomes greater, as the tire-uniformity component $\Delta Vw1$ of the inside front wheel Vw1 becomes smaller with respect to the tire-uniformity component $\Delta Vw2$ of the outside front wheel Vw2.

In order to change the gain in accordance with the composite level of the tire-uniformity components $\Delta Vw1$ and $\Delta Vw2$ of the front wheels in the above described fashion, the map has a characteristic shown in FIG. 7A. The gain gradually becomes greater in the negative, as the tire-uniformity component $\Delta Vw1$ of the inside front wheel Vw1 becomes greater with respect to the tire-uniformity component $\Delta Vw2$ of the outside front wheel Vw2. In contrast, the gain gradually becomes greater in the positive, as the tire-uniformity component $\Delta Vw1$ of the inside front wheel Vw1 becomes smaller with respect to the tire-uniformity component $\Delta Vw2$ of the outside front wheel Vw2. The gain is set in a reverse proportional fashion with respect to the composite level. The gain can be changed within a predetermined range having maximum values on both sides, e.g., a negative maximum value is −0.1, and a positive maximum value is +0.1.

A method for calculating and determining the correcting torque for the in-phase relation is described below. FIGS. 5A, 5B and 5C show the tire-uniformity components and the gain for calculating the correcting torque when the phase relation is the in-phase relation while the vehicle is in the turning movement. A signal $\Delta Vw1$ shows a value of the tire-uniformity component of the inside front wheel Vw1 placed inside of the turning movement of the vehicle. A signal $\Delta Vw2$ shows a value of the tire-uniformity component of the outside front wheel Vw2 placed outside of the turning movement of the vehicle.

In case that the tire-uniformity components $\Delta Vw1$ and $\Delta Vw2$ shown in FIGS. 5A and 5B are calculated in the brake control device 300, the controller 200 determines that the tire-uniformity components $\Delta Vw1$ and $\Delta Vw2$ are in the in-phase relation since the tire-uniformity components $\Delta Vw1$ and $\Delta Vw2$ are shifted smaller than a predetermined phase difference, e.g., ¼ cyclic period. Therefore, the controller 200 uses the map shown in FIG. 7B for determining the gain.

In the gain calculating process in the anti-phase relation using the map shown in FIG. 7A, the gain is determined based on the difference between the tire-uniformity component $\Delta Vw1$ of the inside front wheel Vw1 and the tire-uniformity component $\Delta Vw2$ of the outside front wheel Vw2. However, in the gain calculating process in the in-phase relation using the map shown in FIG. 7B, the gain is determined based on the sum of the tire-uniformity component $\Delta Vw1$ of the inside front wheel Vw1 and the tire-uniformity component $\Delta Vw2$ of the outside front wheel Vw2.

Referring to FIGS. 5A, 5B and 5C, the sum of the tire-uniformity component $\Delta Vw1$ of the inside front wheel Vw1 and the tire-uniformity component $\Delta Vw2$ of the outside front wheel Vw2 at a period of time between a time t0 and a time t1, and a period of time between a time t2 and a time t3 take positive values.

In case that the phase difference between the tire-uniformity component $\Delta Vw1$ of the inside front wheel Vw1 and the tire-uniformity component $\Delta Vw2$ of the outside front wheel Vw2 is smaller than the predetermined phase difference, it is possible to consider that the tire-uniformity component $\Delta Vw1$ of the inside front wheel Vw1 and the tire-uniformity component $\Delta Vw2$ of the outside front wheel Vw2 value increases and decreases in an almost synchronously fashion. In such a condition in the in-phase relation, the sum of the tire-uniformity components $\Delta Vw1$ and $\Delta Vw2$ takes the positive value, generally in a time period where both the rotation speeds of the front wheels are greater than the mean rotation speed of the wheels for a rotation. Therefore, the vehicle receives force propelling the vehicle in a forward direction. In addition, if the vehicle is in a turning movement, the propelling force is transferred into force urging the vehicle in a turning direction. In other words, the vehicle receives more force acting along a lateral axis in a turning direction. The force may be called as a turn promoting force in a turn promoting direction.

In order to decrease the turn promoting force, the controller 200 obtains positive value for the gain at the period of time between the time t0 and the time t1, and the period of time between the time t2 and the time t3, as shown in FIG. 5C and FIG. 7B. The gain having positive value increasingly corrects the fundamental assist torque. Therefore, the electric power steering device supplies greater assist torque that is greater than the fundamental assist torque by an in-phase increasing amount. Such a greater assist torque enables the front wheels to easily change those orientations toward a turning side of the turning movement of the vehicle. Therefore, it is possible to absorb the lateral force acting in the turn promoting direction by adjusting the assist torque. As a result, it is possible to reduce vibration on the vehicle body.

On the other hand, the sum of the tire-uniformity component $\Delta Vw1$ of the inside front wheel Vw1 and the tire-uniformity component $\Delta Vw2$ of the outside front wheel Vw2 takes negative value at a period of time between a time t1 and a time t2, and a period of time between a time t3 and a time t4. In such a case, generally, both the rotation speeds of the front wheels are smaller than the mean rotation speed of the wheels for a rotation. Therefore, it is assumed that force propelling the vehicle in the forward direction is relatively small. In such a condition, if the vehicle is in the turning movement, the vehicle receives smaller force in the turning direction. In other words, the vehicle receives smaller force acting along the lateral axis in the turning direction. In order to follow such a change in the lateral force, the controller 200 determines negative value for the gain at the period of time between the time t1 and the time t2, and the period of time between the time t3 and the time t4. The gain having negative value decreasingly corrects the fundamental assist torque. Therefore, the electric power steering device supplies smaller assist torque that is smaller than the fundamental assist torque by an in-phase decreasing amount. As a result, it is possible to apply a smaller assist torque which is adapted to that the lateral force in the turning direction is weakened.

In the case illustrated in FIGS. 5A, 5B and 5C, the characteristic for calculating the gain for correcting the assist torque is set to vary the gain in accordance with the composite level, i.e., the sum of the tire-uniformity components. As shown in FIG. 5C, the gain is determined to have magnitude in accordance with the sum of tire-uniformity components $\Delta Vw2$ and $\Delta Vw1$.

The gain becomes greater in the positive, as the sum of the tire-uniformity component $\Delta Vw1$ of the inside front wheel Vw1 and the tire-uniformity component $\Delta Vw2$ of the outside front wheel Vw2 becomes greater in the positive. As the sum ($\Delta Vw1+\Delta Vw1$) becomes greater in the positive, the gain increases to have the greater absolute value in the positive. In other words, the controller 200 increases the in-phase increasing amount, as the sum of the tire-uniformity component generated on the outside steerable wheel and the tire-uniformity component generated on the inside steerable wheel becomes greater. The characteristic is required because the lateral force in the turning direction becomes greater, as the sum of the tire-uniformity components $\Delta Vw1$ and $\Delta Vw2$ becomes greater.

The gain becomes greater in the negative, as the sum of the tire-uniformity components $\Delta Vw1$ and $\Delta Vw2$ becomes greater in the negative. As the sum ($\Delta Vw1+\Delta Vw2$) becomes greater in the negative, the gain increases to have greater absolute value in the negative. In other words, the controller 200 increases the in-phase decreasing amount, as the sum of the tire-uniformity component generated on the outside steerable wheel and the tire-uniformity component generated on the inside steerable wheel becomes smaller. The characteristic is required because the lateral force in the turning direction becomes weaker, as the sum of the tire-uniformity components $\Delta Vw1$ and $\Delta Vw2$ becomes greater in the negative.

In order to change the gain in accordance with the sum of the tire-uniformity components $\Delta Vw1$ and $\Delta Vw2$ of the front wheels in the above described fashion, the map has a characteristic shown in FIG. 7B. The gain gradually becomes greater in the positive, as the sum of the tire-uniformity components $\Delta Vw1$ and $\Delta Vw2$ becomes greater in the positive. In contrast, the gain gradually becomes greater in negative, as the sum of the tire-uniformity components $\Delta Vw1$ and $\Delta Vw2$ becomes greater in the negative. The gain is set in a positive proportional fashion with respect to the composite level. The gain can be changed within a predetermined range having maximum values on both sides, e.g., a negative maximum value is $-0.1$, and a positive maximum value is $+0.1$.

Instead of the method described with FIGS. 5A, 5B and 5C, the gain can be obtained by the following method. In the case of FIGS. 5A, 5B and 5C, the gain is calculated based on the sum of the tire-uniformity components $\Delta Vw1$ and $\Delta Vw2$. However, a sign such as plus or minus of the gain and a value of the gain may be separately obtained. The sign can be determined by the sign of the sum of the tire-uniformity components $\Delta Vw1$ and $\Delta Vw2$. The value, i.e., magnitude of the gain can be determined based on a level difference between the tire-uniformity component $\Delta Vw1$ of the inside front wheel Vw1 and the tire-uniformity component $\Delta Vw2$ of the outside front wheel Vw2.

FIGS. 6A, 6B and 6C show the tire-uniformity components $\Delta Vw1$ and $\Delta Vw2$, and the gain calculated by the above mentioned modified embodiment. The tire-uniformity components $\Delta Vw1$ and $\Delta Vw2$ may have different levels, even if the tire-uniformity components $\Delta Vw1$ and $\Delta Vw2$ are in the in-phase relation as shown in FIGS. 6A and 6B. In other case, if the tire-uniformity components $\Delta Vw1$ and $\Delta Vw2$ having the same wave form are sifted slightly from the perfect in-phase relation, the tire-uniformity components $\Delta Vw1$ and $\Delta Vw2$ have difference between instantaneous levels.

As described above, when the vehicle is in the turning movement and the phase relation is in the in-phase relation, the vehicle receives the lateral force in the turning direction during the sum of the tire-uniformity components $\Delta Vw1$ and $\Delta Vw2$ takes a positive value at a period of time between a time t0 and the time t1, and a period of time between a time t2 and a time t3, as shown in FIG. 6C and FIG. 6B. In addition, the difference between the tire-uniformity components $\Delta Vw1$ and $\Delta Vw2$ changes the lateral force. For example, the lateral force in the turning direction becomes greater, as the tire-uniformity component $\Delta Vw2$ of the outside front wheel Vw2 becomes greater with respect to tire-uniformity components $\Delta Vw1$ of the inside front wheel Vw1.

In order to reduce or cancel such a change of the lateral force, the controller 200 may set the gain proportionally in accordance with the difference obtained by subtracting the tire-uniformity component $\Delta Vw1$ of the inside front wheel Vw1 from the tire-uniformity component $\Delta Vw2$ of the outside front wheel Vw2. Therefore, the gain becomes greater in the positive, as the difference ($\Delta Vw2-\Delta Vw1$) becomes greater in the positive. Then, the gain is applied to calculate the correcting torque. The electric power steering device supplies greater assist torque that is greater than the fundamental assist torque by an in-phase increasing amount. The controller 200 increases the in-phase increasing amount, as the tire-uniformity component generated on the outside steerable wheel becomes greater with respect to the tire-uniformity component generated on the inside steerable wheel. As a result, it is possible to absorb the lateral force increased due to the difference between the tire-uniformity components $\Delta Vw1$ and $\Delta Vw2$ by the assist torque acting on the steerable wheels.

On the other hand, the sum of the tire-uniformity component $\Delta Vw1$ of the inside front wheel Vw1 and the tire-uniformity component $\Delta Vw2$ of the outside front wheel Vw2 takes negative value at a period of time between a time t1 and a time t2, and a period of time between a time t3 and a time t4. In such a case, generally, both the rotation speeds of the front wheels are smaller than the mean rotation speed of the wheels for a rotation. Therefore, the vehicle receives smaller lateral force in the turning direction. In such a condition, as described above, the controller 200 decreasingly corrects the assist torque, since the vehicle receives the lateral force decreased. Additionally, a decreased amount of the lateral force is varied in accordance with the difference between the tire-uniformity components ΔVw1 and ΔVw2, even if both the tire-uniformity components ΔVw1 and ΔVw2 are relatively smaller than the mean rotation speed of the wheels.

The decreased amount of the lateral force in the turning direction becomes smaller, as the tire-uniformity components ΔVw2 of the outside front wheel Vw2 becomes relatively greater with respect to the tire-uniformity components ΔVw1 of the inside front wheel Vw1. Therefore, as the tire-uniformity components ΔVw2 of the outside front wheel Vw2 becomes relatively greater with respect to the tire-uniformity components ΔVw1 of the inside front wheel Vw1, the absolute value of the gain is set smaller while keeping it in the negative. As a result, an amount for decreasingly correcting the assist torque is set smaller, as the tire-uniformity component of the outside front wheel becomes greater with respect to the tire-uniformity component of the inside front wheel. The electric power steering device supplies smaller assist torque that is smaller than the fundamental assist torque by an in-phase decreasing amount. The controller 200 decreases the in-phase decreasing amount, as the tire-uniformity component generated on the outside steerable wheel becomes greater with respect to the tire-uniformity component generated on the inside steerable wheel.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

For example, although the above described embodiment uses both the phase difference and the composite level for determining the gain and the correcting torque, it is possible to use the phase difference alone or the composite level alone for calculating the gain and the correcting torque.

For example, although the above described embodiment uses the torque to be generated by the motor as a variable calculated in the blocks 220, 221, and 224 in the controller 200, it is possible to use a current value corresponding to the torque in those blocks.

What is claimed is:

1. A vehicle control apparatus for controlling a vehicle, comprising:
    speed signal generating means for generating speed signals corresponding to each one of steerable wheels;
    discriminating means for discriminating and outputting vibration components on the speed signals from the speed signal generating means, the vibration components having a waveform similar to the sine wave and a cyclic period corresponding to a rotation of the steerable wheel;
    turn determining means for determining whether the vehicle is in a turning movement or not; and
    control means for controlling force on the steerable wheels in order to suppress vibrations on the vehicle, the force being adjusted based on the vibration components discriminated by the discriminating means to have a direction that is the same as a direction of a lateral force on the vehicle caused by the vibration components, when the turning movement of the vehicle is determined by the turn determining means.

2. The vehicle control apparatus claimed in claim 1, wherein the control means adjust the force based on a phase difference and/or a composite level of the vibration components.

3. The vehicle control apparatus claimed in claim 2, wherein the vehicle control apparatus is a component of an electric power steering system which is adapted to supply force on the steerable wheels in order to assist a manipulation on a steering wheel.

4. The vehicle control apparatus claimed in claim 3, wherein
    the electric power steering system has calculating means for calculating a fundamental assist force based on a vehicle speed and rotating force on the steering wheel, and
    the control means adjusts the force by correcting the fundamental assist force based on at least the phase difference between the vibration component generated on an outside steerable wheel and the vibration component generated on an inside steerable wheel, when the vehicle is in the turning movement.

5. The vehicle control apparatus claimed in claim 4, wherein
    the control means increasingly corrects the fundamental assist force by an anti-phase increasing amount so as to act greater assist force than the fundamental assist force in a steering direction, when the vibration component generated on the outside steerable wheel is greater than the vibration component generated on the inside steerable wheel, and when the vibration component generated on the outside steerable wheel and the vibration component generated on the inside steerable wheel are shifted in phase greater than a predetermined phase.

6. The vehicle control apparatus claimed in claim 5, wherein
    the control means increases the anti-phase increasing amount, as the vibration component generated on the outside steerable wheel becomes greater with respect to the vibration component generated on the inside steerable wheel.

7. The vehicle control apparatus claimed in claim 4, wherein
    the control means decreasingly corrects the fundamental assist force by an anti-phase decreasing amount so as to act smaller assist force than the fundamental assist force in a steering direction, when the vibration component generated on the outside steerable wheel is smaller than the vibration component generated on the inside steerable wheel, and when the vibration component generated on the outside steerable wheel and the vibration component generated on the inside steerable wheel are shifted in phase greater than a predetermined phase.

8. The vehicle control apparatus claimed in claim 7, wherein
    the control means increases the anti-phase decreasing amount, as the vibration component generated on the outside steerable wheel becomes smaller with respect to the vibration component generated on the inside steerable wheel.

9. The vehicle control apparatus claimed in claim 4, wherein
    the control means increasingly corrects the fundamental assist force by an in-phase increasing amount so as to act greater assist force than the fundamental assist force in a steering direction, when the sum of the vibration component generated on the outside steerable wheel and the vibration component generated on the inside steerable wheel is greater than a means rotation speed of the wheels, and when the vibration component generated on the outside steerable wheel and the vibration component generated on the inside steerable wheel are shifted in phase smaller than a predetermined phase.

10. The vehicle control apparatus claimed in claim 9, wherein
the control means increases the in-phase increasing amount, as the sum of the vibration component generated on the outside steerable wheel and the vibration component generated on the inside steerable wheel becomes greater.

11. The vehicle control apparatus claimed in claim 9, wherein
the control means increases the in-phase increasing amount, as the vibration component generated on the outside steerable wheel becomes greater with respect to the vibration component generated on the inside steerable wheel.

12. The vehicle control apparatus claimed in claim 4, wherein
the control means decreasingly corrects the fundamental assist force by an in-phase increasing amount so as to act smaller assist force than the fundamental assist force in a steering direction, when the sum of the vibration component generated on the outside steerable wheel and the vibration component generated on the inside steerable wheel is smaller than a means rotation speed of the wheels, and when the vibration component generated on the outside steerable wheel and the vibration component generated on the inside steerable wheel are shifted in phase smaller than a predetermined phase.

13. The vehicle control apparatus claimed in claim 12, wherein
the control means increases the in-phase decreasing amount, as the sum of the vibration component generated on the outside steerable wheel and the vibration component generated on the inside steerable wheel becomes smaller.

14. The vehicle control apparatus claimed in claim 12, wherein
the control means decreases the in-phase decreasing amount, as the vibration component generated on the outside steerable wheel becomes greater with respect to the vibration component generated on the inside steerable wheel.

* * * * *